Oct. 4, 1932. G. GUÉRIN 1,880,388
ELECTRICAL COMMUTATOR MACHINE
Filed April 7, 1930
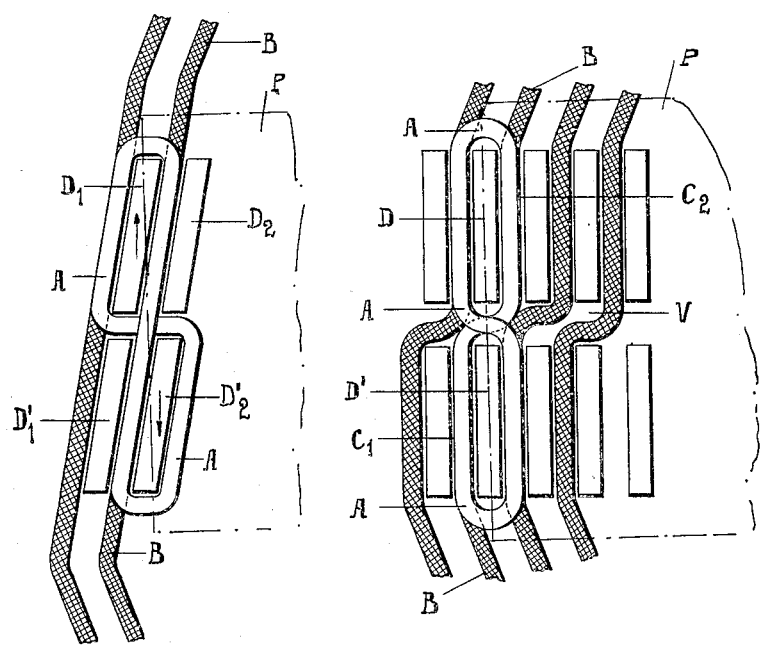
Inventor:-
Gerárd Guérin Patented Oct. 4, 1932

1,880,388

UNITED STATES PATENT OFFICE

GÉRARD GUÉRIN, OF PARIS, FRANCE

ELECTRICAL COMMUTATOR MACHINE

Application filed April 7, 1930, Serial No. 442,354, and in France April 13, 1929.

The present invention has for its object a device for the improvement of the commutation in electrical commutator machines, for continuous or for alternating current.

It is known that the difficulty of commutation increases in proportion to the rate of variation of the flux, which emanates from each tooth beside the slot in which the section in course of commutation is located.

In order to improve the commutation, it has already been proposed to arrange in the slots, together with the armature winding, an auxiliary winding constituted by short circuited sections which slow down the variation of the flux emanating from the teeth during commutation. But these windings are the seat of considerable electromotive forces during their passage under the main poles and the circulating currents which are set up produce considerable heating of the armature, especially in powerful machines, which forbids the use of such windings.

The present invention provides a notable improvement in this known device by suppressing completely the circulating currents due to the action of the main poles.

It consists in the fact that the closed circuits employed have the shape of a figure 8, of which the loops each surround one half of the length of a tooth, and in that the surface area of each loop is penetrated by an equal flux emanating from the field magnet such that the electromotive forces induced by the flux emanating from the field magnet have an aggregate value of nil, and that on the contrary the electromotive forces induced by the reverse flux during commutation are added together.

The accompanying drawing represents by way of example two forms of carrying out the invention.

Fig. 1 is a developed view of a part of the rotor of a commutator machine having an arrangement of the windings according to the invention;

Fig. 2 is a developed view illustrating a modification of the invention discussed in Fig. 1.

In the form of construction indicated in Figure 1, the teeth $D_1$, $D'_1$, $D_2$, $D'_2$, and the slots of the armature are inclined, while the mass of armature laminations is subdivided into two equal parts by a ventilating channel V; the auxiliary short-circuited winding is formed by a conductor A, simply insulated and twisted in the shape of a figure 8, which embraces at one end the half-tooth $D_1$ in one direction and at the other end the half-tooth $D'_2$ in the contrary direction. The inclination of the slots is such that the half-tooth $D_1$ and the half-tooth $D'_2$ are at each instant under the same edge of the pole P, assumed to be straight, so that they are swept at each instant by the same flux. The electromotive force induced in the 8-shaped auxiliary damping winding A is thus nil for any flux emanating from the field magnet pole. On the contrary when the conductor section B of the main winding, which is contained in the slot outlined by the teeth $D_1$, $D'_1$ and $D_2$, $D'_2$ is under commutation, the variation of the flux emanating from the tooth $D_1$ $D'_1$ is in the contrary direction to that which emanates from the tooth $D_2$ $D'_2$ and the electromotive forces induced in the two loops of the auxiliary 8-shaped winding are added together to create a high damping current.

It is clear that instead of inclining the teeth of the armature, the pole tips on the stator can be inclined.

In the form of construction represented in Figure 2, a stepped shape is adapted for the sides of the section of the main winding and the straight figure of the 8 shape for the sections of the auxiliary damping winding. These sections each embrace two half-teeth of the armature which are in line with one another. The crossing of the conductors of the auxiliary winding is effected in the ventilating channel V; while the main conductor section B passes from a slot $C_1$ to a slot $C_2$ offset to the extent of one tooth. It will be seen at once that the electromotive forces, induced by the variation of the flux due to the commutation, are added together and create a high damping current, while the electromotive forces induced by the flux emanating from the pole tips, assumed to be straight, neutralize one another and create no current.

In the preceding arrangements, the auxiliary damping winding is not the seat of any induced current during the passage of the teeth under the main or the auxiliary poles P of the machine.

The invention is evidently not limited to the arrangements described, and it can be carried out according to different modifications. In particular, the auxiliary winding may be composed of plain open loops of which the extremities are connected to the bars of an auxiliary commutator, the brushes of this commutator short circuiting the loops during their passage under the commutating pole tips.

What I claim is:

1. An electrical commutator machine, comprising a field magnet, an armature, teeth provided at the periphery of said armature and divided in equal parts by transverse channels, main windings arranged in the slots of the armature in combination with auxiliary short circuited windings arranged in said slots and said transverse channels, each of said auxiliary windings having the shape of a figure 8, the half loop of the 8 surrounding different parts of equal sections of the teeth, the parts of the main winding conductors located in the slot being adjacent to the opposite sides of each of the two half loops of the auxiliary winding, so that the halves of each loop of the auxiliary winding are subjected to identical field conditions when they pass under the pole pieces, and that the electromotive forces hereby induced in the two half loops are of opposite senses and compensate each other, while the E. M. F. induced in the said half loops by the reversed flux during the commutation in the main winding, are of the same sense and are added together.

2. An electrical commutator machine comprising a field magnet, an armature, teeth provided at the periphery of said armature and arranged at an angle to the axis of the armature, said teeth being divided in two equal parts by a transverse channel, a main winding arranged in the slots of the armature, in combination with auxiliary short circuited windings arranged in said slots and said transverse channel, each of said auxiliary windings having the shape of a figure 8 the two half loops of which are staggered and surround opposite halves of two adjacent teeth of the armature, a part of each conductor of the main winding being located in the same slot adjacent to the opposite sides of the two halves of each loop of the auxiliary winding, so that the halves of each loop of the auxiliary winding are subjected to identical field conditions when they pass under the pole pieces and that the E. M. F. hereby induced in the two half loops are of the contrary sense and compensate each other, while those induced by the reversed flux during the commutation of the main winding are of the same sense and are added together.

3. An electrical commutator machine, comprising a field magnet, an armature, teeth provided at the periphery of said armature parallel to the axis of the poles of the field magnet, said teeth being divided in two equal parts by a transverse channel, main windings arranged in the slots of said armature, each of said windings being located partly in one slot and partly in the opposite half of an adjacent slot, in combination with auxiliary short-circuited windings, arranged in said slots and in said transverse channel, each of the said auxiliary windings having the shape of a figure 8, of which the loops surround the opposite halves of the same tooth of the armature, the relative direction of winding of these two loops being such that the electromotive forces, induced by the flux from the field magnet, have an aggregate value of nil, while those induced by the reverse flux during commutation are added together.

In testimony whereof I have signed my name to this specification.

GÉRARD GUÉRIN.